(12) United States Patent
Huang et al.

(10) Patent No.: US 7,788,477 B1
(45) Date of Patent: Aug. 31, 2010

(54) METHODS, APPARATUS AND ARTICLES OF MANUFACTURE TO CONTROL OPERATING SYSTEM IMAGES FOR DISKLESS SERVERS

(75) Inventors: Wei-Han Huang, Roseville, CA (US); Sachin Chheda, Cupertino, CA (US); Thane M. Larson, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 823 days.

(21) Appl. No.: 11/701,310

(22) Filed: Jan. 31, 2007

(51) Int. Cl.
*G06F 15/177* (2006.01)
(52) U.S. Cl. .................... 713/2; 713/1; 713/100
(58) Field of Classification Search .............. 713/1, 713/2, 100; 709/220, 221, 222; 717/174, 717/175, 176
See application file for complete search history.

(56) References Cited

U.S. PATENT DOCUMENTS 7,356,679 B1 * 4/2008 Le et al. ................... 713/1
2005/0283575 A1 * 12/2005 Kobayashi et al. ......... 711/147
2008/0082665 A1 * 4/2008 Dague et al. .............. 709/226
2009/0172136 A1 * 7/2009 Schulz et al. .............. 709/222

* cited by examiner

*Primary Examiner*—Dennis M Butler

(57) ABSTRACT

A system controls operating system images for a group of diskless servers and comprises an operating system builder, an operating system image manager and a run-time configuration and management tool. The operating system builder is configured to create a binary image of an operating system and modify components of the image by automated operation. The binary image is operative as common base operating system image for multiple servers. The operating system image manager discovers and manages a set of diskless servers in conjunction with a server manageability interface and a boot server. The run-time configuration and management tool for the diskless server set is configured for high-availability management, server and application health monitoring, and enforcing a security protocol between a network and a host server and individual diskless servers.

21 Claims, 8 Drawing Sheets

METHODS, APPARATUS AND ARTICLES OF MANUFACTURE TO CONTROL OPERATING SYSTEM IMAGES FOR DISKLESS SERVERS

BACKGROUND

A server farm is a group of computer servers that are typically maintained and managed by an enterprise. Many different components and combinations of components can be clustered and management can be a difficult problem.

A server farm may include one or more diskless servers that become operational via a bootstrap protocol that is used by a network client to automatically obtain an Internet Protocol (IP) address in a bootstrap process of computers or operating systems running on the computers. Inclusion of diskless servers can increase the difficulty of assembling and managing the server farm.

SUMMARY

An embodiment of a system controls operating system images for a group of diskless servers. The system comprises an operating system builder, an operating system image manager, and a run-time configuration and management tool. The operating system builder is configured to create a binary netbook image of an operating system and modify components of the image by automated operation. The binary image is operative as common base operating system image for multiple servers. The operating system image manager discovers and manages a set of diskless servers in conjunction with a server manageability interface and a boot server. The run-time configuration and management tool for the diskless server set is configured for high-availability management, server and application health monitoring, and enforcing a security protocol between a network and a host server and individual diskless servers.

BRIEF DESCRIPTION OF THE DRAWINGS

Embodiments of the invention relating to both structure and method of operation may best be understood by referring to the following description and accompanying drawings.

DETAILED DESCRIPTION

A boot image manager can manage and supply a set of tools for creation, provision, and management of operating environments for diskless servers.

In some embodiments, the boot image manager can be used to supplement a system that installs operating system (OS) images on local hard drives of server by enabling handling of diskless servers and supporting functionality to manage OS images.

In some embodiments, the boot image manager can support image builder functionality and enables streaming OS images for diskless servers.

Various embodiments of the boot image manager can attain several operational characteristics. The boot image manager can enable the scripted build of multiple operating system images, facilitating operating system creation and rapid deployment of a large number of images. The boot image manager can enable a dashboard user interface for diskless servers in a cluster, facilitating management from a single console. The boot image manager can enable a development platform for highly available solutions. The boot image manager can be implemented to enable sharing computing resources and reduce storage.

Figure 1:
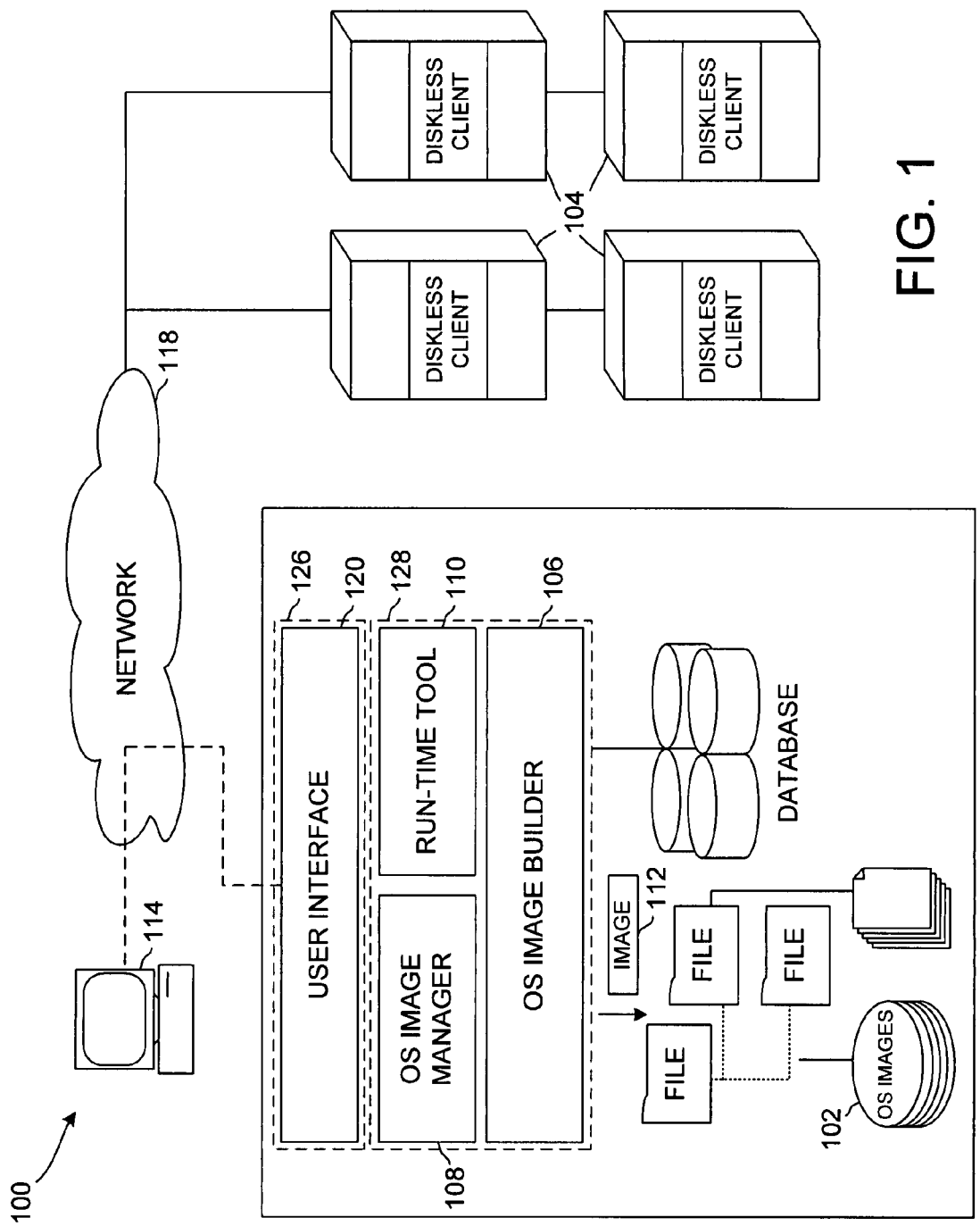
FIG. 1 is a schematic block diagram that illustrates an embodiment of a system that controls operating system images for a group of diskless servers.

Referring to FIG. 1, a schematic block diagram illustrates an embodiment of a system 100 that controls operating system images 102 for a group of diskless servers 104. The system 100 comprises an operating system builder 106, an operating system image manager 108, and a run-time configuration and management tool 110. The operating system builder 106 is configured to create a binary netbook image 112 of an operating system and modify components of the image by automated operation. The binary image 112 is operative as common base operating system image for multiple servers 104. The operating system image manager 108 discovers and manages a set of diskless servers 104 in conjunction with a server manageability interface and a boot server. The run-time configuration and management tool 110 for the diskless server set 104 is configured for high-availability management, server and application health monitoring, and enforcing a security protocol between a network and a host server and individual diskless servers.

In accordance with another embodiment, the system 100 can comprise a set of diskless servers 104 and a management console 114 that is configured to execute the operating system builder 106, the operating system image manager 108, and the run-time configuration and management tool 110. The system 100 can further comprise a boot server and an infrastructure network 118.

The operating system builder 106 can be configured to create the binary image 112 for an operating system on a random access memory (RAM) disk by assembling a kernel, an operating system loader, configuration files, drivers, and data files. The operating system builder 106 can also create a common base operating system image for multiple servers using configuration information from a configuration file loaded at bootstrap loading.

The operating system builder 106 can be implemented to modularize a build script that encapsulates different operating system images whereby the build script can be called from another script to create a set of operating system images with different configuration options.

In some embodiments, the operating system builder 106 can operate to configure the common base operating system image to run one or more specified programs through an initialization daemon whereby the specified program(s) is registered with the host server.

The operating system image builder 106 coordinates file structures between database and file structures, maintains profile tracking and a database of individual servers and clients. The database contains file structures and operating system and configuration files.

The operating system image manager 108 can comprise a web-based or script-based user interface 120 and at least one server-interfacing agent that interact with individual diskless servers 104. The operating system image manager 108 can further comprise a boot server management agent that interacts with a boot server. The user interface 120 forms a web graphical user interface (GUI) to a user who can operate as a controller of the system 100. The user interface 120 is part of a front-end 126 that interacts directly with the user and with a back-end 128 comprising the operating system image manager 108, the operating system image builder 106, and the run-time operating system and high availability manager 110.

The operating system image manager 108 can add and/or remove an operating system and can edit operating system configuration files. The operating system image manager 108 enables assignment and editing of profiles including operating system version and configuration, and performs revision control.

The server-interfacing agent or agents can comprise child-processes that run Expect scripts which interchangeably interact with a server management console 114.

In a particular embodiment, the operating system image manager 108 can further comprise a boot server management agent that configures and manages a boot server including a dynamic host configuration protocol (DHCP) server which dynamically assigns internet protocol (IP) addresses to a requesting entity from a server pool, and a trivial file transfer protocol (TFTP) server comprising an operating system daemon/server serving boot files using the TFTP. The boot server management agent interacts with server-interfacing agents to gather information from individual servers in the diskless server set 104.

The operating system image manager 108 can also be configured to maintain a list of managed diskless servers and corresponding address and configuration information. The operating system image manager 108 can manage a boot rules file that includes file entries for adding, removing, and modifying boot rules.

The run-time configuration and management tool 110 can be operative to execute an application on multiple diskless servers in a functional group of the diskless server set 104 for increased speed and failover and compare results from the functional group diskless servers. The run-time configuration and management tool 110 can add and/or remove servers from the functional group diskless servers. The run-time configuration and management tool 110 can query server status, and can add or remove servers from the set of diskless servers 104. The run-time configuration and management tool 110 enables viewing of server logs, and status such as power on or off, booting, and the like; and enables monitoring of farm status and dynamically allocating and deallocating clients, thereby facilitating high availability.

The run-time configuration and management tool 110 streams operating system images to clients by serving requests and manages internet protocol (IP) interfacing.

The illustrative operating system image file structure is a repository of operating system images and configuration files.

The illustrative system 100 can be used for system management in computing, communications, telephone communications, data storage, and other data processing and control systems. The system 100 can further be used in combination with infrastructure management systems such as System Insight Manager and OpenView, made available by Hewlett Packard Company of Houston, Tex.

Figure 2:
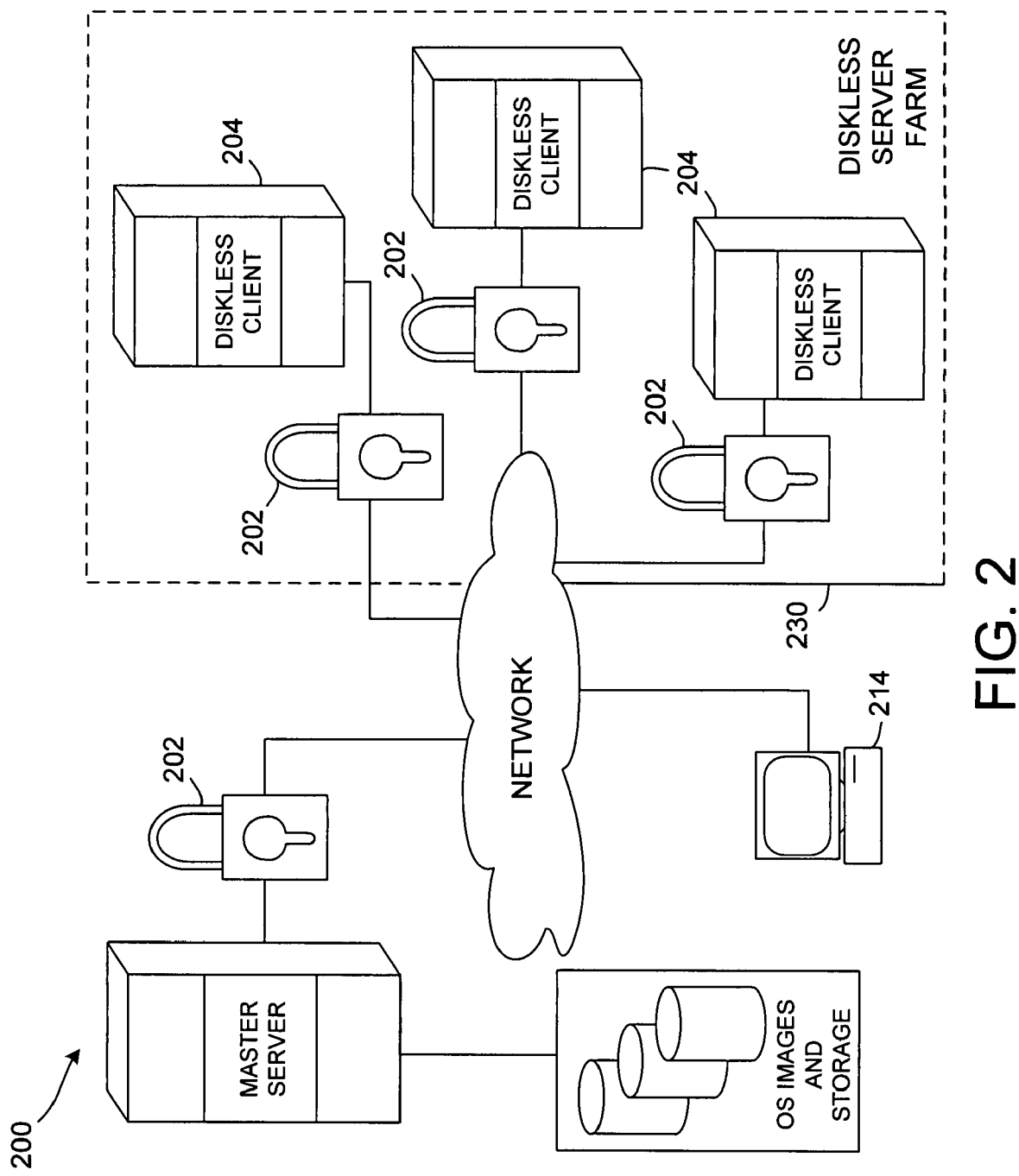
FIG. 2 is a schematic block diagram showing an embodiment of a system that includes security control.

Referring to FIG. 2, a schematic block diagram illustrates an embodiment of a system 200 that includes security control. The system 200 comprises a controller 214 that executes a run-time configuration and management tool that configures a security element 202 that manages security details including public key size, security protocol, and key exchange mechanism for diskless bootstrap loading and exchanges a public/private key prior to bootstrap loading the binary image for diskless clients 204 in a diskless server farm 230. Transactions for diskless bootstrap loading are secured whereby eavesdropping and snooping of data stored in the binary image are prevented.

The system 200 uses a boot image manager to secure diskless bootstrap loading via a public/private key transaction, enabling sharing of computing resources and storage reduction while maintaining security.

Figure 3:
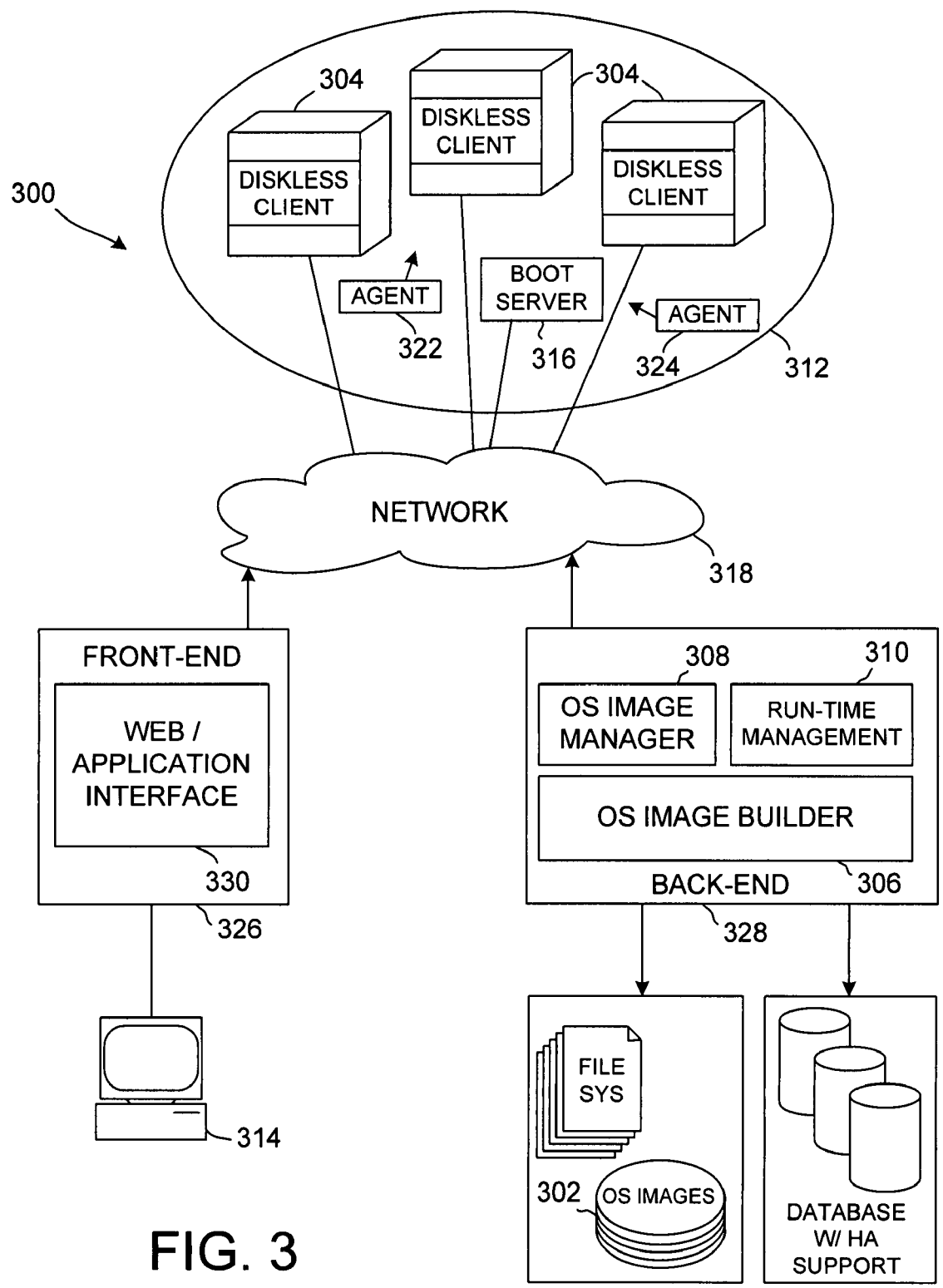
FIG. 3 is a schematic block diagram that depicts an embodiment of a boot image manager.

Referring to FIG. 3, a schematic block diagram depicts an embodiment of a boot image manager 300 configured with modules including an operating system (OS) image builder 306, an OS image manager 308, and a run-time configuration manager 310.

The illustrative boot image manager 300 enables one-site management of OS images for a diskless server farm 304 and includes a tool 310 to create and manage OS images including Internet Protocol (IP) configuration. The boot image manager 300 supports tools for setting and managing clustered configurations, and enables improved and simplified revision control for server farms or clusters.

The illustrative boot image manager 300 can be implemented, as shown, as a web-based front end 326 to a combination of backend tools 328 for creating and managing Operating System (OS) images 302 for a farm of diskless servers 304. The boot image manager 300 can be used in applications such as telecommunications and high performance computing deployments and others in which servers are typically deployed without any local storage, for example hard disks, and can be reconfigured to suit the computation capacity and load.

Basic components of a diskless server farm arrangement 312 include diskless servers 304, a management console 314 that controls execution of the boot image manager tools 300 via a web/application interface 330, a boot server 316, and miscellaneous infrastructure such as a network 318 or other devices.

In the illustrative embodiment, the tool 300 can be composed of three modules including an operating system image builder 306, an operating system image manager 308, and the run-time configuration and management tool 310.

The operating system image builder 306 can be implemented as a script-based build tool that has the ability to manipulate and change binary and text files. Typically a binary image of the operating system is created by capturing the appropriate kernel, OS loader, configuration files, drivers, and miscellaneous data files. The files can be written to a file equivalent of a RAM disk.

For example, a suitable process in Linux for the operating system image builder 306 can comprise actions of creating and mounting the RAM disk file to the current system, and copying appropriate files for diskless operation. The kernel compile parameter files are modified and the kernel re-compiled from user-selected options. Configuration files such as network, storage mounts, user accounts, and passwords are typically modified.

One aspect of some embodiments of the operating system image builder module 306 is a build tool that automates modification of appropriate configuration and kernel parameter files, eliminating manual setup and configuration. The build script can be modularized to encapsulate different operating system images such that the build script can be called from yet another script to create a set of operating system images with different configuration options. For example, the build script can be used to create a set of operating system images with ascending Internet Protocol (IP) address or to operate as failover pairs.

Another aspect that can be implemented in some embodiments of the operating system image builder module 306 and the build tool is a capability to create a common base image for multiple servers. Configuration information can be stored in a separate file loaded at boot. For example, a standard kernel and ramdisk can be loaded using an Extensible Firmware Interface (EFI) configuration (efi.conf) file to store basic configuration information, enabling a reduction in storage.

The operating system image build module 306 can be configured to run specific programs, for example through operation of an initialization (init) daemon, to register with the host server or a peer or, to setup further configuration. An example is a server deployed in an Active-Active failover configuration that can register into the network to start receiving payload traffic. Another example is a server that can register to a centralized server which can then selectively load applications onto the registering server.

In various sample embodiments, the operating system image builder 306 can be constructed using Perl dynamic programming language; Python interpreted, interactive, object-oriented programming language; Tool Command Language (TCL TK), PHP hypertext preprocessor, and the like with both a command line and a web front end.

The operating system image manager 308 is a tool that can operate in conjunction with an existing tool such as SIM to discovery and manage a set of diskless servers 304. The operating system image manager tool 308 interfaces with a manageability interface and remote console of a server as well as the boot server 316. The operating system image manager 308 can include of a web-based or script-based front end 326 as well as back-end 328 comprising of server-interfacing-agents 322 interacting with individual servers 304 as well as a boot-server-management-agent 324 interacting with the boot server 316.

The operating system image manager tool 308 enables functionality including adding and/or removing a system in the managed server set, and querying server status such as power off, power on, booting, operating system running and the like. Other operations include configuring a server including defining which operating system image to use and assigning a profile as the type of operating system to boot, and the like. The operating system image manager 308 also enables management of a server such as rebooting a server including specifying a boot file to use to boot, check logs, open console, and the like.

In an illustrative embodiment, agents interacting with the server in the back-end 328 can be child-processes running Expect scripts that interchangeably interact with the server's management console or the server's operating console to perform the listed operating system image manager functions. To specify a boot file to use, the agent can use the EFI functionality of a directed LANboot that is available on some servers. Additionally agents can interact with the EFI boot manager to set-up retries as well as alternate boot images to ensure highly available systems. The agents can be called server-interfacing-agents 322.

The operating system image manager TOOL 308 can also include an agent that is responsible for setting up and managing the boot server 316 which can be called a boot server management agent 324. Boot servers typically support two sets of functionality, a Dynamic Host Configuration Protocol (DHCP) which dynamically assigns IP addresses to a requesting entity from a pool of server and Trivial File Transfer Protocol (TFTP). The DHCP server supports instructions specifying which specific boot file to supply to a server. The TFTP server comprises an operating system daemon/service serving boot files using the TFTP protocol. The boot server management agent 324 interacts with the server-interfacing agents 322 to gather information from the individual servers in the server farm. The information includes network ports and corresponding MAC address, various interconnects, basic system configurations, and others.

The boot-server-management agent 324 maintains a list of managed servers in a dynamic data structure in combination with information on the Local Area Network Media Access Control (LAN MAC) addresses, system configurations, interconnects, and others. The agent 324 also manages the boot rules file, for example the bootp.tab file on Linux, by adding, removing, and/or modifying entries based on user instructions. The entries typically include information such as Media Access Control (MAC) address of network port used to LANboot, IP address to assign, a boot file location that points to the operating system image created with the operating system image builder tool 306.

The run-time configuration and management tool 310 functions upon bootstrap loading of the system to support application and high availability configurations setup and management.

High performance computing applications typically use some level of setup and management which can be performed by the runtime configuration and management module 310. The module 310 monitors server and application health in the manner of applications such as Systems Insight Management (SIM) and Openview.

The run-time configuration and management tool 310 extends operations beyond Systems Insight Management (SIM), OpenView, Service Guard applications from Hewlett Packard Company by increased functionality in high availability. Several different methods exist for configuring high availability for systems in scaled configuration including Active-Active, Active-Passive, Voting/Quorum based capabilities. The methods use some form of setup, control and monitoring. The run-time configuration and management module 310 can be configured to run high availability agents on individual servers in the server farm.

For example, the run-time configuration and management tool 310 can configure a set of servers for the purpose of billing in a Voice-over-Internet Protocol (VoIP) telecom environment. A simplified example of the billing function for a VoIP-based call can include receiving call information such as source, destination, start time, and call duration. The type of billing is resolved, for example time of day, calling plan, current usage, or other billing. The run-time configuration and management tool 310 can determine whether external routing is used for the call, for example using network service provider information. If so, call information is sent to a revenue share database. The run-time configuration and management tool 310 sends a copy the completed transaction of the database to an audit database and a revenue recognition database.

The illustrative functions can be executed on multiple servers for speed and failover and the results received and compared. The run-time module 310 can be configured to add and/or remove servers from a functional group by notifying the source and recipients servers of the change. The illustrative operation of the run-time configuration and management tool 310 is described in general terms including concepts of set-up and management of high availability agents and in terms of operation in combination with management applications such as SIM, OpenView, and ServiceGuard functionality. In various implementations, the run-time configuration and management tool 310 can be associated with many different types of functionality.

Referring to FIGS. 4A through 4F, a set of flow charts illustrate a method 400 for controlling operating system images for a group of diskless servers. A binary image of an operating system is created 402 on a random access memory (RAM) disk by assembling several components including a kernel, an operating system loader, configuration files, drivers, data files, and possibly other executable and/or data elements. Configuration and kernel parameter files are automatically modified 404. A common base operating system image for multiple servers is created 406 using configuration information from a configuration file that is loaded at bootstrap loading. A set of diskless servers is discovered and managed 408 in conjunction with a server manageability interface and a boot server. Run-time configuration and management are performed 410 for the diskless server set including operations of high-availability management, server and application health monitoring, and enforcing a security protocol between a network and a host server and individual diskless servers.

In some embodiments, the common base operating system image can be configured to run at least one specified program through an initialization daemon whereby the specified program or programs are registered with the host server.

Figure 4A:
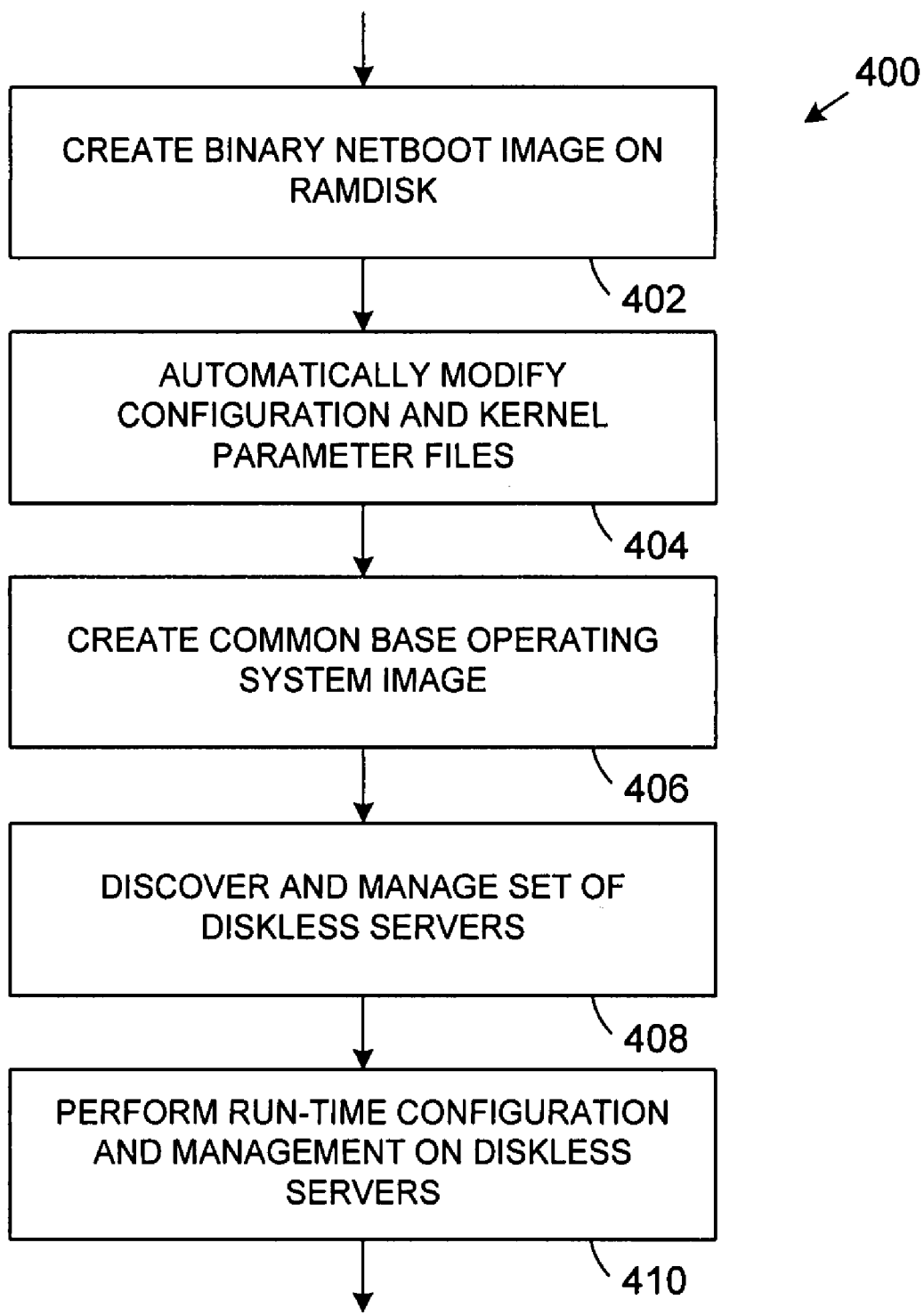
FIGS. 4A through 4F are a set of flow charts depicting a method for controlling operating system images for a group of diskless servers.
Figure 4B:
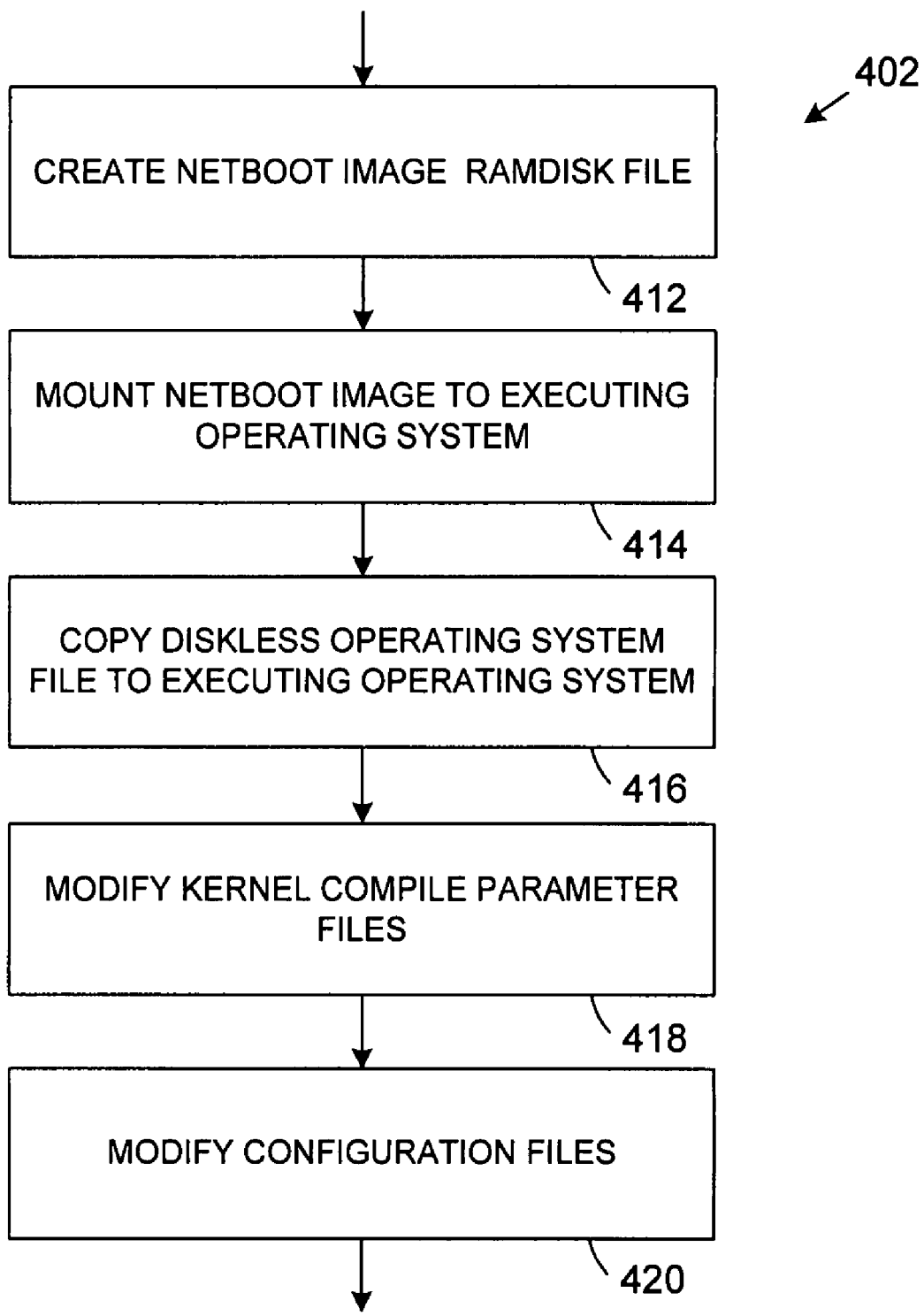

Referring to FIG. 4B, a flow chart depicts an embodiment of a method 402 for creating the binary image. A image random access memory (RAM) disk file is created 412 and mounted 414 to an executing operating system. The method 402 further comprises copying 416 diskless operation files to the executing operating system and modifying 418 kernel compile parameter files, then re-compiling a modified kernel from user-selected options. Configuration files including network, storage mounts, user accounts, and passwords can be modified 420.

Figure 4C:
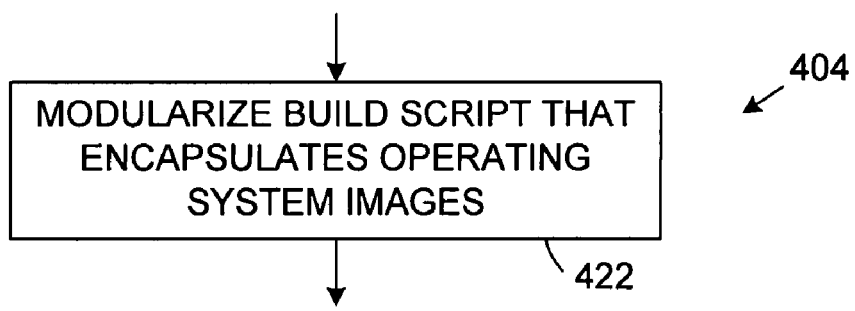

Referring to FIG. 4C, a flow chart shows an embodiment of a method for modifying 404 configuration and kernel parameter file by 422 modularizing a build script that encapsulates different operating system images whereby the build script can be called from another script to create a set of operating system images with different configuration options.

Figure 4F:
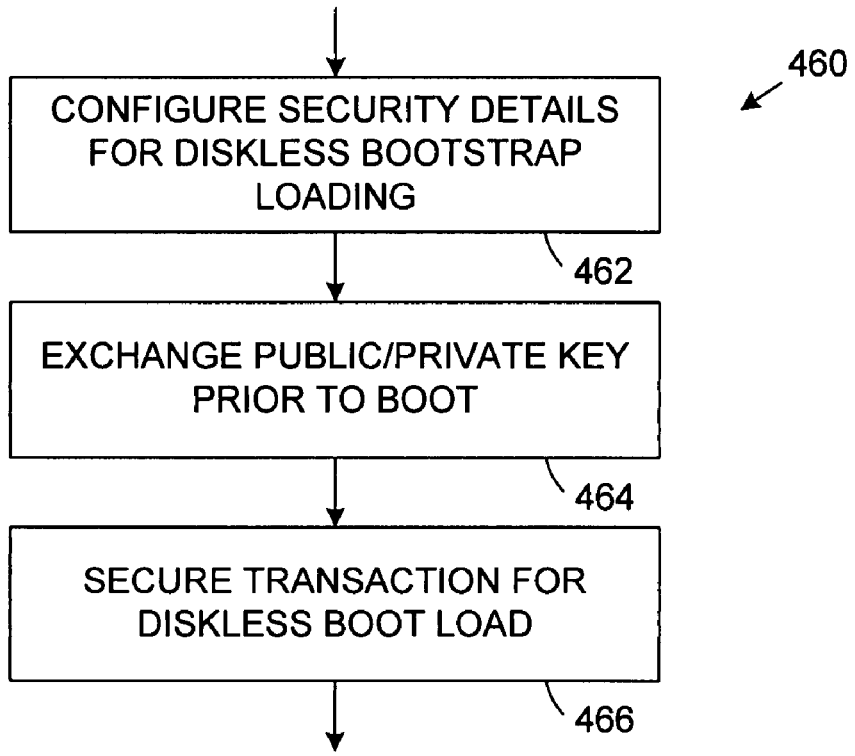
Figure 4D:
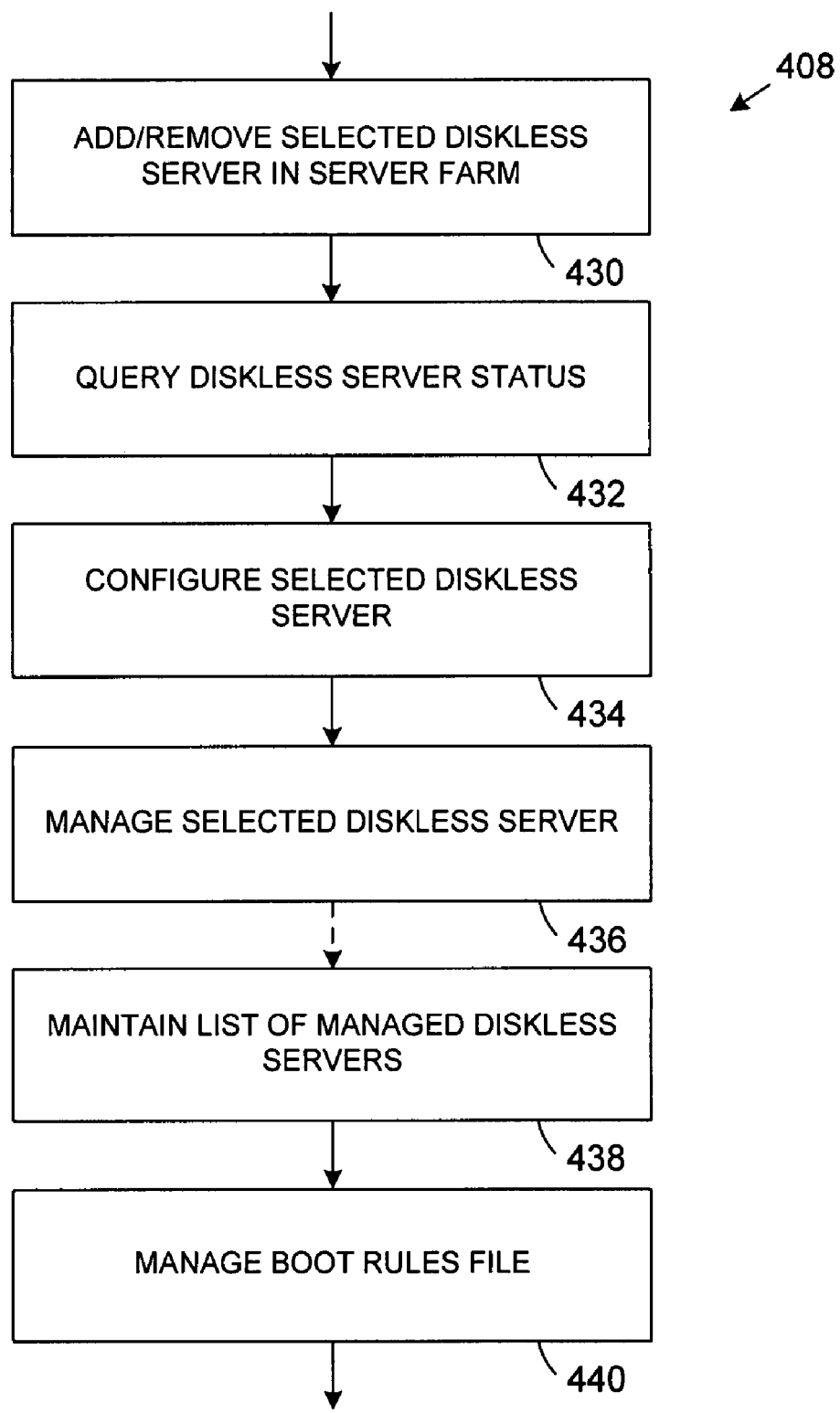

Referring to FIG. 4D, a flow chart depicts an embodiment of a method 408 for discovering and managing a set of diskless servers by adding and/or removing 430 a selected diskless server in the diskless server set. Status of individual diskless servers in the diskless server set is queried 432 including status such as power off, power on, booting, and operating system running. A selected diskless server in the diskless server set is configured 434, thereby selecting an operating system image for usage. A selected diskless server in the diskless server set is managed 436 including operations of rebooting the selected diskless server including specifying a boot file, checking logs, opening a console, and the like.

In some embodiments, the method 408 for discovering and managing the set of diskless servers can further comprise maintaining 438 a list of managed diskless servers and corresponding address and configuration information. A boot rules file can be managed 440 by operations including adding, removing, and modifying boot rules file entries.

Figure 4E:
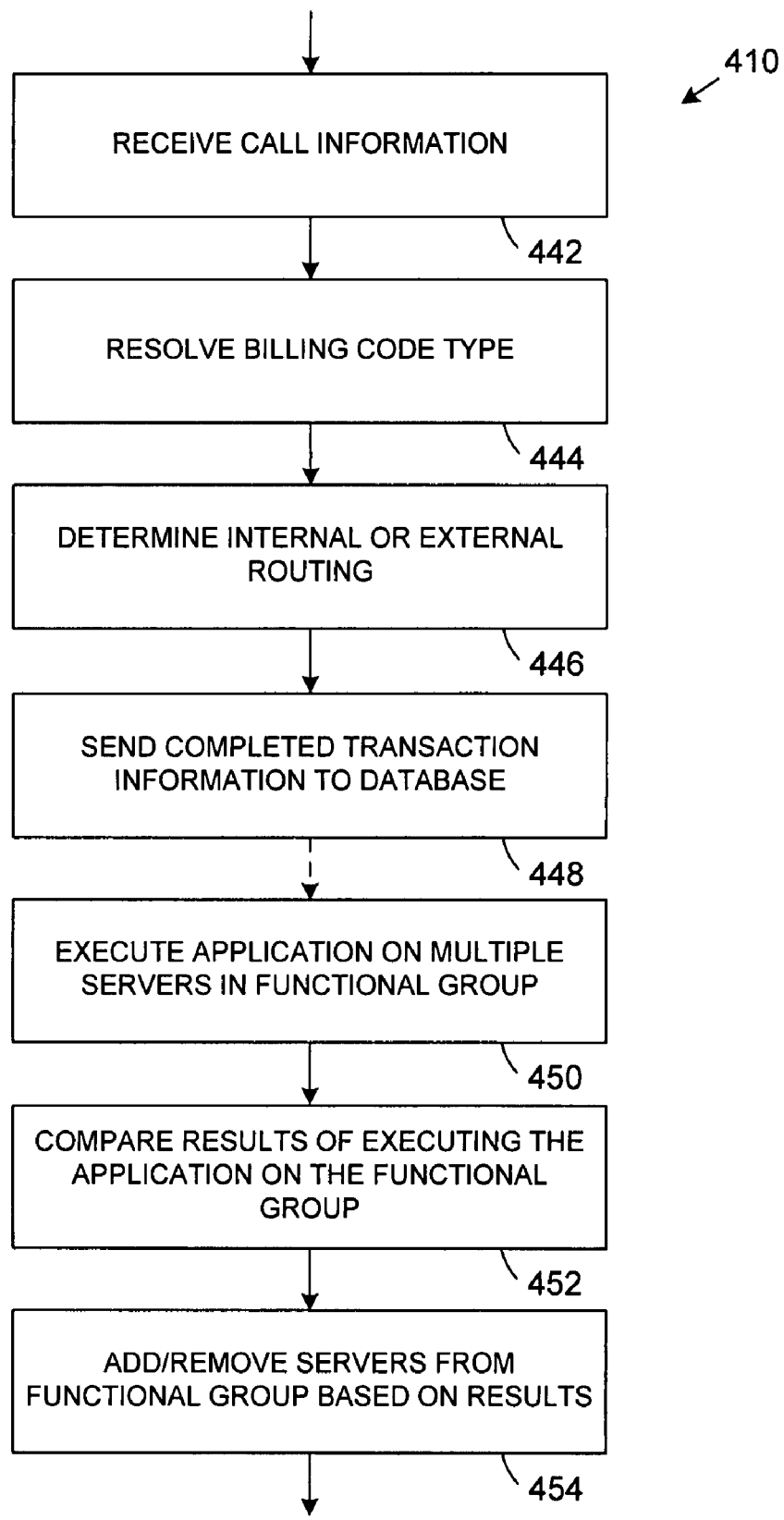

Referring to FIG. 4E, a flow chart illustrates an embodiment of a method 410 for performing run-time configuration and management for initializing a billing system in a Voice-over-Internet Protocol (VoIP) application. Call information including source, destination, start time, and call duration is received 442 and billing code type is resolved 444. Internal or external routing is determined 446 and completed transaction information is sent 448 to a database.

In some embodiments, run-time configuration and management 410 can further comprise executing 450 an application on a plurality of diskless servers in a functional group of the diskless server set for increased speed and failover. Results from the functional group diskless servers are compared 452 and servers from the functional group diskless servers are added and/or removed 454 based on the results.

Referring to FIG. 4F, a schematic flow chart illustrates an embodiment of a method 460 for implementing security in operating system images for a group of diskless servers. The method 460 comprises configuring 462 security details for diskless bootstrap loading including public key size, security protocol, and key exchange mechanism. A public/private key is exchanged 464 prior to bootstrap loading the binary image. A transaction for diskless bootstrap loading is secured 466 whereby eavesdropping and snooping of data stored in the binary image is prevented.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method for controlling operating system images for a group of diskless servers comprising:
   creating a binary image of an operating system on a random access memory (RAM) disk by assembly of a kernel, an operating system loader, configuration files, drivers, and data files;
   modifying configuration and kernel parameter files by automated operation;
   creating a common base operating system image for multiple servers using configuration information from a configuration file loaded at bootstrap loading;
   discovering and managing a set of diskless servers in conjunction with a server manageability interface and a boot server; and
   performing run-time configuration and management for the diskless server set including high-availability management, server and application health monitoring, and enforcing a security protocol between a network and a host server and individual diskless servers.

2. The method according to claim 1 wherein creating the binary image comprises:
   creating a image random access memory (RAM) disk file;
   mounting the RAM disk file to an executing operating system;
   copying diskless operation files to the executing operating system;
   modifying kernel compile parameter files and re-compiling a modified kernel from user-selected options; and
   modifying configuration files including network, storage mounts, user accounts, and passwords.

3. The method according to claim 1 wherein modifying the configuration and kernel parameter files comprises modularizing a build script that encapsulates different operating system images whereby the build script can be called from another script to create a set of operating system images with different configuration options.

4. The method according to claim 1 further comprising configuring the common base operating system image to run at least one specified program through an initialization daemon whereby the at least one specified program(s) is registered with the host server.

5. The method according to claim 1 wherein discovering and managing the set of diskless servers comprises:
   adding and/or removing a selected diskless server in the diskless server set;
   querying status individual diskless servers in the diskless server set including power off, power on, booting, and operating system running;
   configuring a selected diskless server in the diskless server set whereby an operating system image is selected for usage; and
   managing a selected diskless server in the diskless server set including rebooting the selected diskless server including specifying a boot file, checking logs, opening a console.

6. The method according to claim 1 wherein discovering and managing the set of diskless servers comprises:

maintaining a list of managed diskless servers and corresponding address and configuration information; and
   managing a boot rules file including adding, removing, and modifying boot rules file entries.

7. The method according to claim 1 wherein performing the run-time configuration and management comprises initializing a billing system in a Voice-over-Internet Protocol (VoIP) application by:
   receiving call information including source, destination, start time, and call duration;
   resolving billing code type;
   determining internal or external routing; and
   sending completed transaction information to a database.

8. The method according to claim 1 wherein performing the run-time configuration and management comprises:
   executing an application on a plurality of diskless servers in a functional group of the diskless server set for increased speed and failover;
   comparing results from the functional group diskless servers; and
   adding and/or removing servers from the functional group diskless servers.

9. The method according to claim 1 further comprising:
   configuring security details for diskless bootstrap loading including public key size, security protocol, and key exchange mechanism;
   exchanging a public/private key prior to bootstrap loading the binary image; and
   securing a transaction for diskless bootstrap loading whereby eavesdropping and snooping of data stored in the binary image is prevented.

10. A system to control operating system images for a group of diskless servers comprising:
    an operating system builder to create a binary image of an operating system and modify components of the image by automated operation, the binary image operative as a common base operating system image for multiple servers;
    an operating system image manager to discover and manage a set of diskless servers in conjunction with a server manageability interface and a boot server; and
    a run-time configuration and management tool for the set of diskless servers to implement high-availability management, server and application health monitoring, and enforce a security protocol between a network and a host server and individual diskless servers, wherein at least one of the operating system builder, the operating system manager, or the run-time configuration and management tool comprises a tangible article of manufacture storing machine-accessible instructions.

11. The system according to claim 10 further comprising:
    the set of diskless servers;
    a management console to implement the operating system builder, the operating system image manager, and the run-time configuration and management tool;
    the boot server; and
    an infrastructure network.

12. The system according to claim 10 wherein the operating system builder is to:
    create the binary image of an operating system on a random access memory (RAM) disk by assembly of a kernel, an operating system loader, configuration files, drivers, and data files; and
    create the common base operating system image for multiple servers using configuration information from a configuration file loaded at bootstrap loading.

13. The system according to claim 10 wherein the operating system builder is to modularize a build script that encapsulates different operating system images whereby the build script can be called from another script to create a set of operating system images with different configuration options.

14. The system according to claim 10 wherein the operating system builder is to configure the common base operating system image to run at least one specified program through an initialization daemon whereby the at least specified program is registered with the host server.

15. The system according to claim 10 wherein the operating system image manager comprises:
 a web-based or script-based user interface;
 at least one server-interfacing agent that interacts with individual diskless servers; and
 a boot server management agent that interacts with a boot server.

16. The system according to claim 15 wherein the at least one server-interfacing agent comprises child-processes that run Expect scripts that interchangeably interact with a server management console.

17. The system according to claim 10 wherein the operating system image manager further comprises a boot server management agent that configures and manages a boot server operative including a dynamic host configuration protocol (DHCP) server which dynamically assigns internet protocol (IP) addresses to a requesting entity from a server pool, and a trivial file transfer protocol (TFTP) server comprising an operating system daemon/server serving boot files using the TFTP, the boot server management agent operative to interact with server-interfacing agents to gather information from individual servers in the diskless server set.

18. The system according to claim 10 wherein the operating system image manager is to maintain a list of managed diskless servers and corresponding address and configuration information, and manage a boot rules file including adding, removing, and modifying boot rules file entries.

19. The system according to claim 10 wherein the run-time configuration and management tool is to execute an application on a plurality of diskless servers in a functional group of the diskless server set for increased speed and failover, compare results from the functional group diskless servers, and add and/or remove servers from the functional group diskless servers.

20. The system according to claim 10 wherein the run-time configuration and management tool is to configure security details including public key size, security protocol, and key exchange mechanism for diskless bootstrap loading, exchange a public/private key prior to bootstrap loading the binary image, and secure a transaction for diskless bootstrap loading whereby eavesdropping and snooping of data stored in the binary image are prevented.

21. A tangible article of manufacture storing machine-accessible instructions that, when executed, cause a machine to control operating system images for a group of diskless servers by:
 creating a binary image of an operating system on a random access memory (RAM) disk by assembly of a kernel, an operating system loader, configuration files, drivers, and data files;
 modifying configuration and kernel parameter files by automated operation;
 creating a common base operating system image for multiple servers using configuration information from a configuration file loaded at bootstrap loading;
 discovering and managing a set of diskless servers in conjunction with a server manageability interface and a boot server; and
 performing run-time configuration and management for the set of diskless servers including high-availability management, server and application health monitoring, and enforcing a security protocol between a network and a host server and individual diskless servers.

* * * * *